(12) United States Patent
Spielmann

(10) Patent No.: US 8,613,473 B2
(45) Date of Patent: Dec. 24, 2013

(54) RELEASABLE PLUG-IN CONNECTION FOR PIPELINES OR THE LIKE

(75) Inventor: Norbert Spielmann, Ebern (DE)

(73) Assignee: FTE automotive GmbH, Ebern (DE)

( * ) Notice: Subject to any disclaimer, the term of this patent is extended or adjusted under 35 U.S.C. 154(b) by 593 days.

(21) Appl. No.: 12/383,488

(22) Filed: Mar. 25, 2009

(65) Prior Publication Data

US 2010/0090461 A1 Apr. 15, 2010

(30) Foreign Application Priority Data

Mar. 27, 2008 (DE) .......................... 10 2008 015 811

(51) Int. Cl.
*F16L 37/088* (2006.01)

(52) U.S. Cl.
USPC .......................................... 285/307; 285/321

(58) Field of Classification Search
USPC ....................... 285/82, 319, 321, 901, 23, 307
See application file for complete search history.

(56) References Cited

U.S. PATENT DOCUMENTS

| | | | | | |
|---|---|---|---|---|---|
| 3,428,340 | A | * | 2/1969 | Pelton ................................ | 285/95 |
| 3,628,768 | A | * | 12/1971 | Hutt ................................. | 251/148 |
| 4,423,891 | A | * | 1/1984 | Menges ............................ | 285/305 |
| 4,431,216 | A | | 2/1984 | Legris | |
| 4,640,534 | A | * | 2/1987 | Hoskins et al. .................. | 285/143.1 |
| 4,725,081 | A | * | 2/1988 | Bauer ............................... | 285/305 |
| 4,756,558 | A | * | 7/1988 | Beamer ............................ | 285/39 |
| 4,781,400 | A | * | 11/1988 | Cunningham ................... | 285/39 |
| 4,834,423 | A | * | 5/1989 | DeLand ............................ | 285/39 |
| 4,884,829 | A | * | 12/1989 | Funk et al. ....................... | 285/24 |
| 4,981,586 | A | * | 1/1991 | Bartholomew ................... | 210/435 |
| 5,067,754 | A | * | 11/1991 | Bartholomew ................... | 285/319 |
| 5,120,085 | A | * | 6/1992 | Shin ................................. | 285/317 |
| 5,472,016 | A | * | 12/1995 | Szabo ............................... | 138/89 |
| 5,540,463 | A | * | 7/1996 | Potokar ............................ | 285/319 |
| 5,593,188 | A | * | 1/1997 | McNaughton et al. .......... | 285/319 |
| 5,700,040 | A | * | 12/1997 | Kujawski ......................... | 285/319 |
| 5,707,085 | A | * | 1/1998 | Kubiak ............................. | 285/86 |
| 5,718,463 | A | * | 2/1998 | Hollnagel ......................... | 285/319 |
| 5,855,399 | A | * | 1/1999 | Profunser ........................ | 285/305 |
| 5,931,509 | A | * | 8/1999 | Bartholomew ................... | 285/93 |
| 5,992,903 | A | * | 11/1999 | Bartholomew ................... | 285/319 |
| 2004/0232696 | A1 | * | 11/2004 | Andre .............................. | 285/319 |
| 2005/0156430 | A1 | * | 7/2005 | Alder et al. ...................... | 285/319 |
| 2006/0082146 | A1 | * | 4/2006 | Heim et al. ...................... | 285/305 |
| 2008/0150280 | A1 | * | 6/2008 | Feger et al. ...................... | 285/326 |

FOREIGN PATENT DOCUMENTS

DE 102004062887 B3 * 10/2005
EP 1705417 A2 * 9/2006

* cited by examiner

*Primary Examiner* — James Hewitt
(74) *Attorney, Agent, or Firm* — Reising Ethington P.C.

(57) ABSTRACT

A plug-in connection for hydraulic lines and machines, in particular for use on motor vehicles, has a receiving part and a complementary associated plug-in part which is sealed off from the receiving part in the final assembled position. When the plug-in part is inserted into the receiving part, a spring-elastic securing element, which is fitted captively and in a prestressed manner as a spring force storage device on the receiving part in a pre-assembly position, is displaced by the plug-in part relative to the receiving part in such a way that, when the final assembled position is reached, its stored spring force is released by the joining movement itself and the securing element latches in a force-fitting manner between bearing surfaces of the receiving part and of the plug-in part.

17 Claims, 3 Drawing Sheets

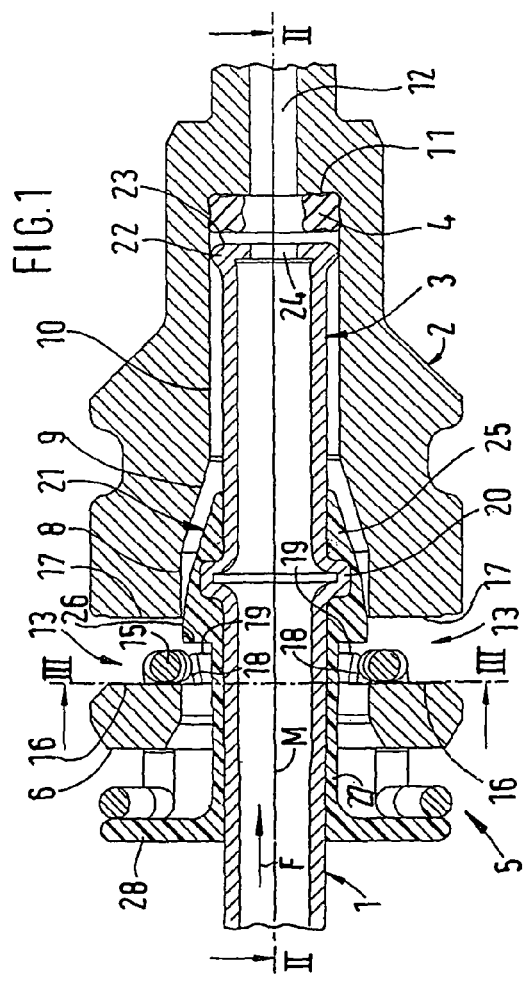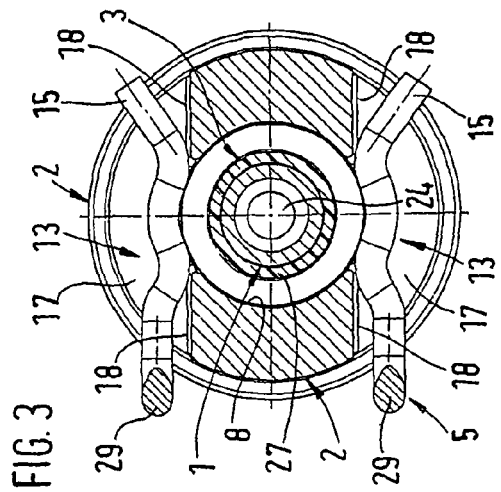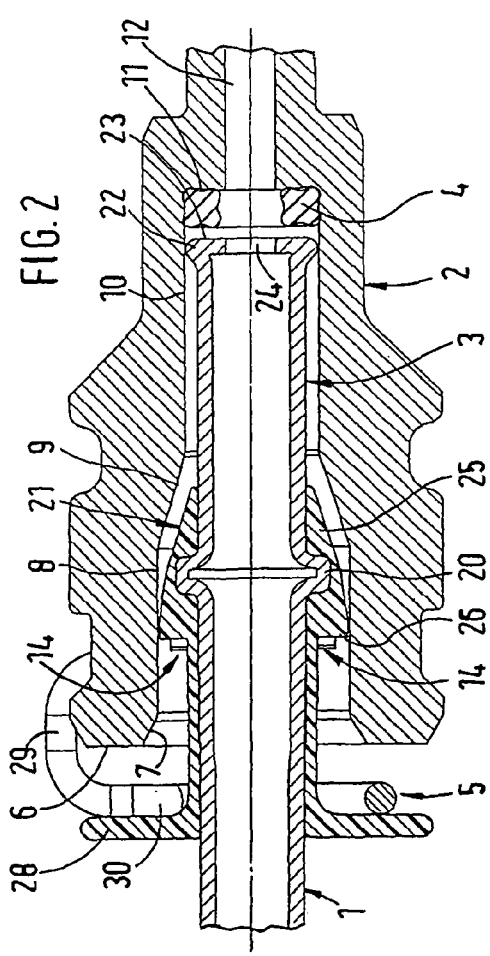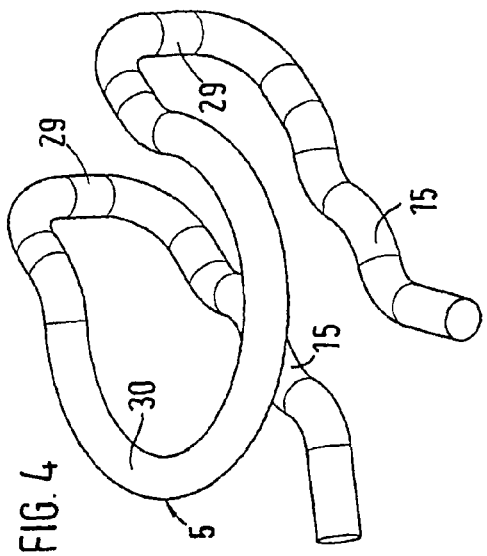

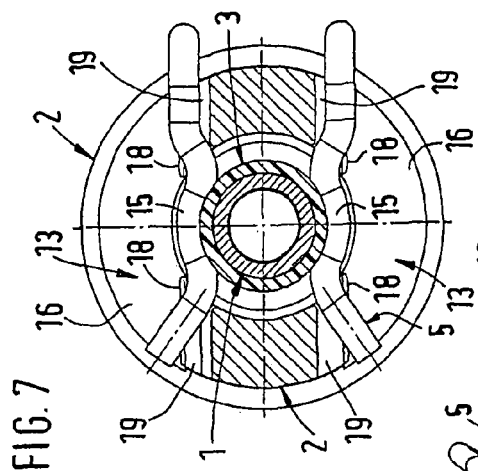
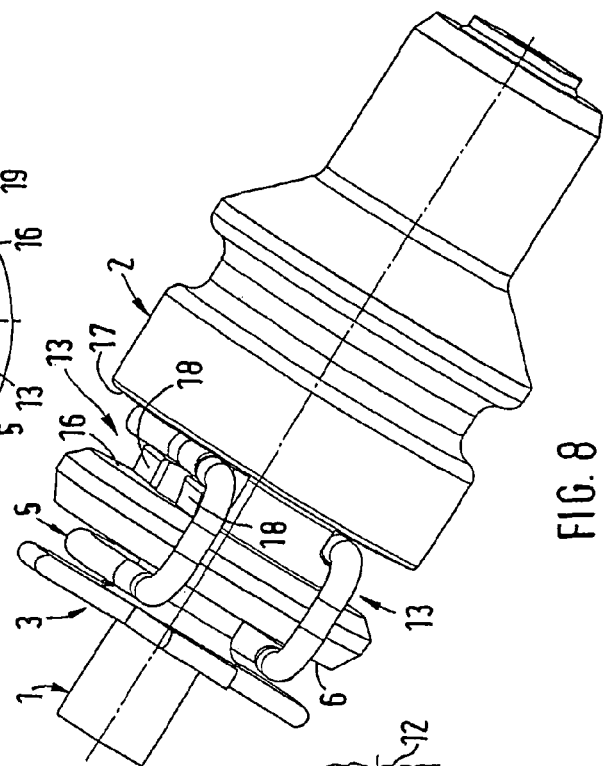
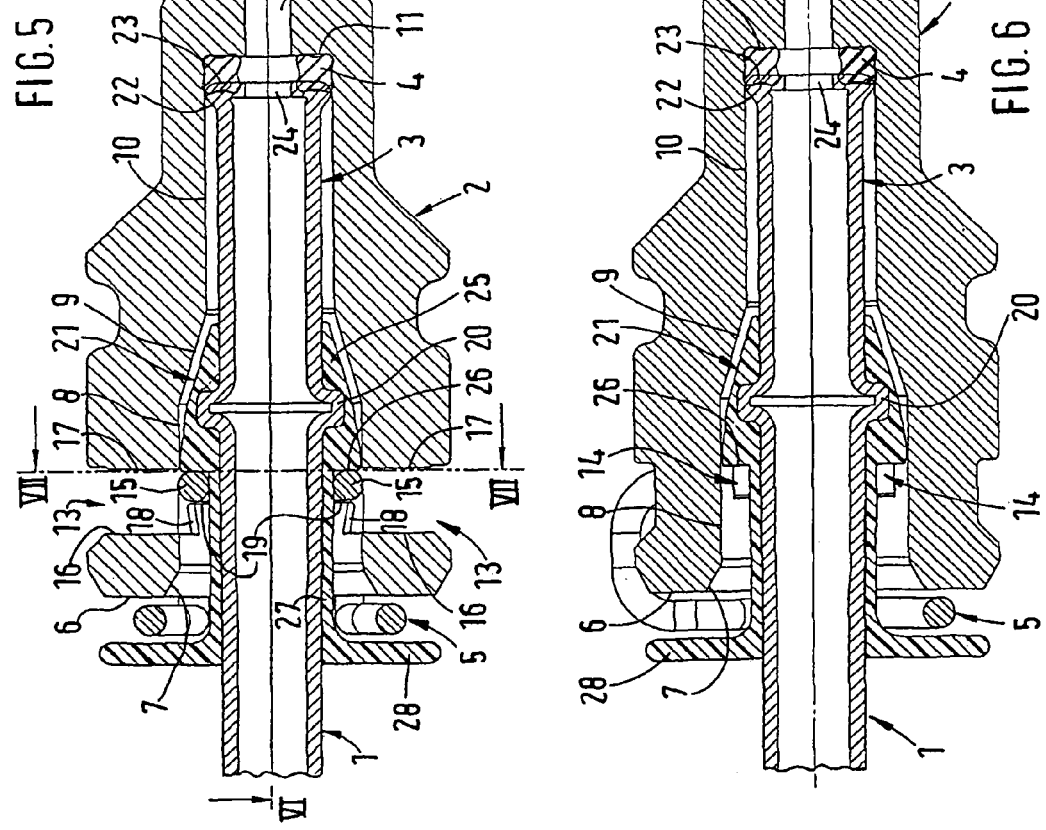

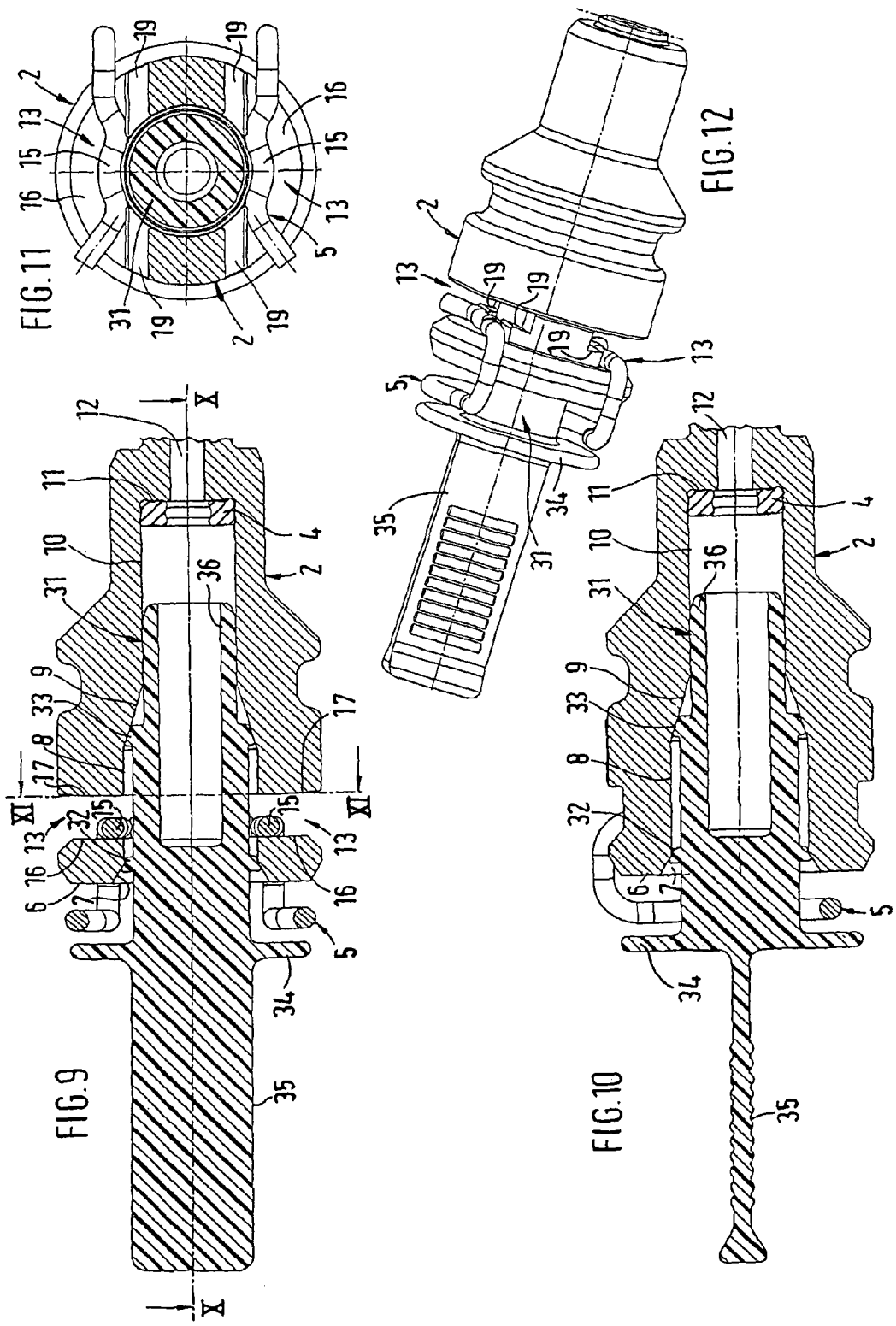

RELEASABLE PLUG-IN CONNECTION FOR PIPELINES OR THE LIKE

TECHNICAL FIELD

The invention relates to a releasable plug-in connection for pipelines or the like. The invention relates in particular to a releasable plug-in connection for pipelines or the like in hydraulic clutch actuation and brake systems for motor vehicles.

BACKGROUND OF THE INVENTION

In a known plug-in connection (EP 1 635 103 A1), the securing element has to yield, i.e. elastically deform in a widening manner against the spring force, when the plug-in part is inserted into the receiving part, until the securing element at the end of the insertion process latches behind an abutment surface on the plug-in part, as a result of which the plug-in part of the plug-in connection is secured in the final assembled position against inadvertent release from the receiving part.

This known plug-in connection allows a reliable securing of the plug-in part to prevent the plug-in part from being inadvertently pulled out of the receiving part in the final assembled position, but considerable assembly forces are required in order to cause the securing element to yield. As a result, the assembly of the plug-in connection is made more difficult, particularly in the case of overhead assembly situations and at locations which are difficult to access or which are not in the field of vision.

What is needed is a releasable plug-in connection of the type specified, which requires lower assembly forces than in the prior art and which can therefore be assembled reliably even in difficult assembly situations.

SUMMARY OF THE INVENTION

According to one aspect of the invention, a releasable plug-in connection for pipelines or the like, in particular in hydraulic clutch actuation and brake systems for motor vehicles, includes a receiving part, a plug-in part which is connected to the pipeline or the like and can be inserted into the receiving part in a joining direction. A sealing element seals between the receiving part and the plug-in part. A spring-elastic securing element is fitted on the receiving part in a pre-assembly position and is designed to secure the plug-in part to the receiving part in the final assembled position of the plug-in connection. The securing element in the pre-assembly position is fitted on the receiving part in a prestressed manner as a spring force store and can be released from its prestressed state in the final assembled position of the plug-in connection in order to secure the plug-in part to the receiving part.

The retaining forces of the plug-in connection are achieved not by a widening yielding of the securing element brought about by applying considerable force during the joining process, as in the prior art, but rather by prestressing the securing element on the receiving part. The securing element acts as a spring force store and can be fitted with prestress on the receiving part without difficulty before the plug-in part is joined to the receiving part. In the final assembled position, the stored spring force of the securing element is released using only a little force and the securing element snaps into the securing position for the plug-in part.

Advantageously, the arrangement may be such that the securing element in the pre-assembly position bears against at least one retaining surface on the receiving part with at least one spring arm in an outwardly curved manner transversely to the joining direction so as to create the prestressed state, from which the spring arm can be released when triggered in order to bring about the latching engagement between a bearing surface on the receiving part and a bearing surface on the plug-in part so as to secure the plug-in connection.

Preferably, the securing element has two opposite spring arms which in the pre-assembly position are flexed in opposite directions and bear against opposite retaining surfaces on the receiving part, from which the two spring arms can be released simultaneously when triggered in order to bring about the latching engagement between a bearing surface on the receiving part and bearing surfaces on the plug-in part so as to secure the plug-in connection.

Advantageously, the joining or insertion movement itself, when the final assembled position is reached, i.e. in the end phase of the movement, can trigger the securing of the plug-in part to the receiving part. In this case, the securing element fitted in a prestressed manner on the receiving part is positioned so as to be triggered by the insertion movement of the plug-in part when the final assembled position is reached, the insertion movement taking place in the joining direction.

Preferably, the securing element may be arranged on the receiving part such that it can be displaced in the joining direction by the plug-in part in order to trigger the securing of the plug-in part to the receiving part. As a result, the described latching engagement of the spring arm or spring arms is triggered by a relative displacement brought about by the plug-in part, preferably a relative displacement of the securing element on the receiving part. For this purpose, a tappet which is provided for displacing the securing element may be fixedly attached to the plug-in part. This tappet may be integrally formed in one piece on the plug-in part.

Preferably, the retaining surfaces on the receiving part are arranged with an upward incline in the joining direction, so that a slight yielding of the spring arm or spring arms which requires little force has to take place in order to trigger the securing. This prevents any inadvertent triggering of the securing element, since the spring arm or spring arms are located in a stable position on the retaining surfaces.

The securing of the plug-in part to the receiving part is preferably triggered when the sealing element between the receiving part and the plug-in part is elastically deformed at the end of the plug-in movement, i.e. in the final assembled position. The restoring force of the sealing element ensures that the spring arm or spring arms is/are latched onto the plug-in part in a play-free manner between the bearing surfaces on the receiving part and the bearing surface on the plug-in part.

In order to protect the receiving part from dirt in the plug-in region of the plug-in part, but in particular to prevent inadvertent triggering of the securing element prestressed on, the receiving part, it may be provided that the securing element in the prestressed pre-assembly position is protected by a protective plug which can be inserted into the receiving part in the joining direction instead of the plug-in part.

In this case, advantageously the maximum possible insertion travel of the protective plug on the receiving part is limited by stops fitted on the protective plug, which are associated with stop surfaces on the receiving part.

Finally, it is also advantageous if the protective plug is provided with a cover element which, with the protective plug inserted to a maximum, is spaced apart from the securing element but engages essentially over the latter from outside in a protective manner. In this way, it is ensured that the cover element of the protective plug on the one hand cannot itself make contact with and trigger the prestressed securing element, but on the other hand prevents the securing element from being able to be triggered when the protective plug is inserted.

BRIEF DESCRIPTION OF THE DRAWINGS

Further details and features of the invention will be explained in more detail below with reference to a preferred example of embodiment which is shown in the appended drawings. In the drawings, on scales which are enlarged by comparison with the actual dimensions and which in some cases differ:

FIG. 1 shows a longitudinal section through the plug-in connection with its components during the insertion process shortly before reaching the final assembled position, i.e. shortly before triggering the prestressed securing element, FIG. 2 shows the longitudinal section through the plug-in connection in the relative position of its components shown in FIG. 1, along the section line II-II in FIG. 1, FIG. 3 shows the cross section through the plug-in connection in the relative position of its components shown in FIGS. 1 and 2, along the section line in FIG. 1, FIG. 4 shows a perspective view of the spring-elastic securing element, FIG. 5 shows a longitudinal section, similar to FIG. 1, through the plug-in connection with its components in the final assembled position, secured by the triggered securing element to prevent the plug-in part from being pulled out of the receiving part, FIG. 6 shows the longitudinal section through the plug-in connection in the relative position of its components shown in FIG. 5, along the section line VI-VI in FIG. 5, FIG. 7 shows the cross section through the plug-in connection in the relative position of its components shown in FIGS. 5 and 6, along the section line VII-VII in FIG. 5, FIG. 8 shows a perspective view of the plug-in connection in the secured final assembled position of its components shown in FIGS. 5 to 7, FIG. 9 shows a longitudinal section through the receiving part of the plug-in connection with the prestressed securing element and the protective plug inserted therein, FIG. 10 shows the longitudinal section through the receiving part and the protective plug along the section line X-X in FIG. 9, FIG. 11 shows the cross section through the receiving part and the protective plug along the section line XI-XI in FIG. 9, and FIG. 12 shows a perspective view of the receiving part shown in FIGS. 9 to 11 with the prestressed securing element and the inserted protective plug.

DETAILED DESCRIPTION OF THE PREFERRED EXAMPLE OF EMBODIMENT

FIGS. 1 to 3 and 5 to 8 show, as an example of a use location for the releasable plug-in connection according to the invention, the hydraulically tight connection of a pipeline 1 to the receiving part 2 of a hydraulic component, such as to a master or slave cylinder, a pressure modulator for brake systems or to other hydraulic brake or clutch actuation units for motor vehicles. However, the plug-in connection can also be used for the hydraulically tight connection of two pipelines, e.g. in a hydraulic clutch or brake system for motor vehicles. The pipeline 1 and the receiving part 2 are shown broken off in the drawings.

As shown in particular in FIGS. 1, 2, 5, 6 and 8, the receiving part 2 is shaped in the manner of a sleeve and is designed to receive a plug-in part 3 which can be inserted in a joining direction F and which is connected to the pipeline 1. The plug-in part 3 may be formed, as shown, in one piece with the pipeline 1. The plug-in connection has between the receiving part 2 and the plug-in part 3 a rubber-elastic sealing element 4 which seals between these parts in the final assembled position, as illustrated in particular in FIGS. 5 and 6. Also fitted on the receiving part 2 in the manner which will be described below is a spring-elastic securing element 5 which is shown individually in FIG. 4 and which serves for releasably securing the plug-in part 3 to the receiving part 2 in the final assembled position in order to prevent it from being pulled out.

The receiving part 2, which is preferably made from a metal material, such as steel or an aluminum alloy, has a central through-bore designed as a stepped bore for receiving the plug-in part 3. The through-bore begins, for example proceeding from left to right in FIG. 2, at a circular ring-shaped end face 6 with a chamfer 7 which facilitates the introduction of the plug-in part 3 and which is adjoined by a first cylindrical bore section 8 which ends at a conical transition section 9 which is followed by a second cylindrical bore section 10 of smaller diameter which extends as far as an annular step 11, at which a third cylindrical bore section 12 begins, the diameter of which is smaller than that of the second cylindrical bore section 10. Located on the annular step 11 is the sealing element 4, in the illustrated example a so-called square ring made from an elastomeric material suitable for hydraulic lines.

The receiving part 2 has two diametrically opposed transverse slots 13, which each run perpendicular to the central axis M of the plug-in connection and form in the inner wall surface of the first cylindrical bore section 8 two opposite through-openings 14 (FIGS. 2, 6) for spring arms 15 of the securing element 5. Side wall surfaces 16 and 17 limit the transverse slots 13 and end at the side wall surfaces 16 at in each case two stepped retaining surfaces 18 for the spring arms 15 of the securing element 5. The total of four retaining surfaces 18 are adjoined by bearing surfaces 19 running perpendicular to the central axis M for the spring arms 15. The axial distance between the bearing surfaces 19 and the side wall surfaces 17, i.e. the axial width of the through-openings 14, is somewhat larger than the wire diameter of the securing element 5 which is bent from round spring steel wire.

The plug-in part 3 comprises a section of the metal pipeline 1 which in the case of brake applications in motor vehicles is generally a double-walled, internally and externally copper-plated steel pipe which is moreover provided on the outer circumference with a zinc layer applied by electroplating for anti-corrosion reasons, on which zinc layer there is an additional plastic coating. Before the end of the pipeline section, there is an upset flared ring 20 which protrudes radially outwards beyond the pipe outer diameter and around which a rotationally symmetrical plastic body 21 is injected in a form-fitting manner. The plastic body 21 is injected from a suitable thermoplastic, for example from polyamide 6,6, which may have a content of glass fibers.

At the outer end of the pipe section there is a further upset flared ring 22 which has a sealing surface 23 on the end side which, in the final assembled position, bears in a sealing manner against the sealing element 4 while elastically deforming the latter, as illustrated in FIGS. 5 and 6. A central through-bore 24 in the sealing surface 23 corresponds approximately in terms of diameter to the diameter of the third cylindrical bore section 12 in the receiving part 2. The outer diameter of the flared ring is somewhat smaller than the diameter of the second cylindrical bore section 10 in the receiving part 2, so that the outer end of the pipe section is guided against the inner wall surface of the second cylindrical bore section 10 when the plug-in part 3 is inserted into the receiving part 2.

The plastic body 21 of the plug-in part 3 engages over the flared ring 20 with a conical section 25, the cone angle of which corresponds approximately to that of the conical transition section 9. The largest diameter of the conical section 25 is somewhat smaller than the diameter of the first cylindrical bore section 8, so that the conical section 25 can be displaced in the bore section 8 in a manner guided axially by its region of largest diameter during the insertion process. The conical section 25 is delimited towards the outside by a ring-shaped bearing surface 26 oriented perpendicular to the central axis M for the two spring arms 15 of the securing element 5. In the final assembled position, shown in FIGS. 5 to 8, the spring arms 15 are located between the bearing surfaces 19 on the receiving part 2 and the bearing surface 26 on the plug-in part 3, as a result of which the plug-in part is secured against being pulled out of the receiving part.

Provided next to the bearing surface 26 is a tubular intermediate part 27 of the plastic body 21, to which a tappet 28 is connected on the outside. The tappet 28 may have the shape of a plate oriented perpendicular to the central axis M or, as illustrated in FIG. 8, the shape of a cross or of a star. The intermediate part 27 and the tappet 28 are integral components of the plastic body 21 injected onto the pipeline section.

As can be seen in particular from FIG. 4, the two spring arms 15 of the securing element 5 are connected in one piece with an arc section 30 via clip sections 29, wherein the arc section 30 is located in a plane which is oriented essentially parallel to the common plane of the spring arms 15. The distance between the two planes is important for the triggering process which is yet to be described, and is matched to the distance between the bearing surface 26 and the tappet 28. The arc section 30 has an inner diameter which allows contact-free passage of the largest diameter of the conical section 25 of the plastic body 21 of the plug-in part 3 through the arc section 30.

The retaining surfaces 18 on the receiving part 2 are arranged with an upward incline i.e. radially outward in the joining direction F, as can be seen for example from FIGS. 1, 5 and 8. In this way, the securing element 5 with its spring arms 15 can assume a stable position when the securing element 5 on the receiving part 2 is pushed onto the retaining surfaces 18 from the side or, more specifically, onto the inner edges of the retaining surfaces 18. When pushed on from the side, the spring arms 15 are bent away from one another in the pre-assembly position, until they come to rest with prestress on the inner edges of the retaining surfaces 18. The securing element 5 is thus preassembled on the receiving part 2 in a prestressed manner as a spring store.

When the plug-in part 3 is now introduced into the receiving part 2 in the joining direction F, the tappet 28 in the position of the parts shown in FIGS. 1 to 3 strikes the arc section 30 of the securing element 5. If the insertion movement in the joining direction F is continued, the tappet 28 displaces the securing element 5 in the joining direction F by displacing it on the receiving part 2. In the process, the spring arms 15 are displaced on the retaining surfaces 18 with a slight elastic increase in their distance from one another, until the spring prestress on the two spring arms 15 is triggered simultaneously as a result of the spring arms 15 reaching the end of the retaining surfaces 18 which have an upward incline i.e. radially outward in the joining direction. At this point in time, the sealing element 4 between the annular step 11 and the sealing surface 23 of the flared ring 22 is already elastically compressed, as illustrated in FIGS. 5 and 6.

During the triggering process, the two spring arms 15 snap in between the bearing surfaces 19 on the receiving part 2 and the bearing surface 26 on the plastic body 21 of the plug-in part 3, as a result of which they have reached the final assembled position shown in FIGS. 5 to 8. By means of its elastic restoring force, and without losing its sealing effect, the sealing element 4 presses the bearing surface 26 against the spring arms 15, which are in turn supported on the bearing surfaces 18 on the receiving part 2. The plug-in part 3 is thus reliably secured by the securing element 5 to prevent it from being pulled out of the receiving part 2.

As shown in FIGS. 9 to 12, the securing element 5 in the prestressed pre-assembly position can be protected by a protective plug 31 to prevent inadvertent triggering. The protective plug 31 can be inserted into the receiving part 2 in the joining direction F instead of the plug-in part 3. The maximum possible insertion travel of the protective plug 31 is limited by stops 32 and 33 fitted on the protective plug 31, which are associated with stop surfaces on the receiving part 2. In the example shown, the chamfer 7 serves as a stop surface for the stops 32 and the cone surface at the transition section 9 serves as a stop surface for the stops 33.

The protective plug 31, which is injection-molded in one piece from a suitable plastic, is provided with a disc-shaped cover element 34 which, when the protective plug 31 is inserted to a maximum into the receiving part 2, is at a sufficient distance from the arc section 30 of the securing element 5 so that the protective plug 31 cannot trigger the securing element 5. The dimensions of the cover element 34 are advantageously selected in such a way that it engages over the securing element 5 in a protective manner. A handle 35 which facilitates handling of the protective plug 31 is attached to the cover element 34. The protective plug 31 is secured by its inner tubular end region 36 in the second cylindrical bore section 10 of the receiving part 2 with a friction fit.

In the example of embodiment described above, the retaining surfaces 18 on the receiving part 2 are arranged with an upward incline in the joining direction F so that the spring arms 15 of the securing element 5 assume a stable position on the retaining surfaces 18 in the pre-assembly position. In addition to the upwardly inclined orientation of the retaining surfaces or instead of an upwardly inclined orientation thereof, small raised areas, such as knubs, or small depressions, such as grooves, may also be arranged on the retaining surfaces (not shown in the drawings), on or in which the spring arms act or engage in the pre-assembly position in order to make it even more difficult for the spring-elastic securing element to be inadvertently triggered.

In the example of embodiment described above, the securing element 5 is bent from a spring steel wire with a round, i.e. circular, cross section, as in the prior art cited in the introduction. However, this cross-sectional geometry is not absolutely necessary. Use may also be made of spring steel wires with polygonal cross-sectional areas, for example with square cross-sectional areas.

There is proposed a releasable plug-in connection for hydraulic lines and machines, in particular for use on motor vehicles, consisting of a receiving part and a complementary associated plug-in part which is sealed off from the receiving part in the final assembled position. When the plug-in part is inserted into the receiving part, a spring-elastic securing element, which is fitted captively and in a prestressed manner as a spring force store on the receiving part in a pre-assembly position, is displaced by the plug-in part relative to the receiving part in such a way that, when the final assembled position is reached, its stored spring force is released by the joining movement itself and the securing element latches in a force-fitting manner between bearing surfaces of the receiving part and of the plug-in part. The axial lock achieved as a result between the receiving part and the plug-in part can be released when releasing the plug-in connection only by lateral displacement of the securing element, for which purpose the securing element has to yield elastically. The pre-assembly position of the securing element on the receiving part can be secured for transport and handling purposes by axially pushing a protective plug into the receiving part instead of the plug-in part.

Variations and modifications are possible without departing from the scope and spirit of the present invention as defined by the appended claims.

I claim:

1. A plug-in connection for pipelines, the plug-in connection having a pre-assembly position and a final assembled position and comprising:
   a receiving part;
   a plug-in part which is connected to the pipeline and can be inserted in a joining direction into the receiving part;
   a sealing element for sealing between the receiving part and the plug-in part;
   a spring-elastic securing element which is initially fitted on the receiving part in a flexed prestressed state at the pre-assembly position and is constructed to secure the plug-in part to the receiving part in the final assembled position of the plug-in connection;
   the securing element in the pre-assembly position being fitted on the receiving part in said flexed prestressed state as a spring force storage device and can be released from said flexed prestressed state by the plug-in part to a state of decreased stress in the final assembled position of the plug-in connection in order to secure the plug-in part to the receiving part;
   the securing element being arranged on the receiving part such that it can be axially displaced in the joining direction by the plug-in part when moved in the joining direction in order to trigger the securing of the plug-in part to the receiving part; and
   a tappet being provided for displacing the securing element in said joining direction being fixedly attached to the plug-in part and when moved in the joining direction.

2. A plug-in connection according to claim 1, wherein the securing element in the pre-assembly position bears against at least one retaining surface on the receiving part with at least one spring arm in an outwardly curved manner transversely to the joining direction so as to create the flexed prestressed state, from which retaining surface the spring arm can be axially displaced in the joining direction beyond an end of said retaining surface and to said state of decreased stress when triggered in order to bring about the latching engagement between a bearing surface at said end of said retaining surface on the receiving part and a bearing surface on the plug-in part so as to secure the plug-in connection.

3. A plug-in connection according to claim 2, wherein the at least one retaining surface on the receiving part is arranged with a radially outward incline in the joining direction.

4. A plug-in connection according to claim 1, wherein the receiving part has bearing surfaces at respective ends of said retaining surfaces and the plug-in part has a bearing surface and wherein the securing element has two opposite spring arms which are in said flexed prestressed state at the pre-assembly position by being fixed in opposite directions and bearing against opposite retaining surfaces on the receiving part, the two spring arms can be axially displaced in the joining direction and beyond said respective ends of said opposite retaining surfaces and released simultaneously when triggered to said state of decreased stress in order to bring about the latching engagement between the bearing surfaces on the receiving part and the bearing surface on the plug-in part so as to secure the plug-in connection.

5. A plug-in connection according to claim 1, wherein the securing element fitted in said flexed prestressed state on the receiving part is positioned so as to be triggered to move to said state of decreased stress by the insertion movement of the plug-in part when the final assembled position is reached, said insertion movement taking place in the joining direction.

6. A plug-in connection according to claim 1, wherein the tappet is integrally formed in one piece on the plug-in part.

7. A plug-in connection according to claim 1, wherein the securing of the plug-in part to the receiving part is provided so as to be triggered when the sealing element between the receiving part and the plug-in part is elastically deformed in the final assembled position.

8. A plug-in connection according to claim 1, wherein the securing element in the prestressed pre-assembly position is protected against inadvertent triggering by a protective plug, which can be inserted into the receiving part in the joining direction instead of the plug-in part.

9. A plug-in connection according to claim 8, wherein the protective plug has a maximum possible insertion travel on the receiving part, which travel is limited by stops fitted on the protective plug, which stops are associated with stop surfaces on the receiving part.

10. A plug-in connection according to claim 9, wherein the protective plug is provided with a cover element which, with the protective plug inserted to a maximum, is spaced apart from the securing element but engages essentially over the latter from outside in a protective manner.

11. A plug-in connection according to claim 1, wherein the securing element having at least one spring arm which when in the pre-assembly position bears against at least one retaining surface on the receiving part with said at least one retaining surface having a radially outwardly directed incline in the joining direction so as to create the flexed prestressed state in a stable manner, from which retaining surface the spring arm can be axially displaced in the joining direction beyond an end of said retaining surface and released to said state of decreased stress when triggered in order to bring about the latching engagement between a bearing surface located at said end of said retaining surface on the receiving part and said bearing surface on the plug-in part so as to secure the plug-in connection.

12. A plug-in connection according to claim 1, wherein the at least one retaining surface on the receiving part is arranged with a radially outward incline in the joining direction.

13. A plug-in connection for pipelines, the plug-in connection having a pre-assembly position and a final assembled position and comprising:
   a receiving part;
   a plug-in part which is connected to the pipeline and can be inserted in a joining direction into the receiving part;
   a sealing element for sealing between the receiving part and the plug-in part;
   a spring-elastic securing element which is initially fitted on the receiving part in a flexed prestressed state and is arranged to secure the plug-in part to the receiving part in the final assembled position of the plug-in connection;
   the securing element in the pre-assembly position being fitted on the receiving part in a said prestressed state as a spring force storage device and can be released from said prestressed state by the plug-in part in the final assembled position of the plug-in connection in order to secure the plug-in part to the receiving part;

the securing element having at least one spring arm which when in the pre-assembly position bears against at least one retaining surface on the receiving part with said at least one retaining surface having a radially outwardly directed incline in the joining direction so as to create the prestressed state in a stable manner, from which retaining surface the spring arm can be axially displaced in the joining direction beyond an end of said retaining surface and released when triggered in order to bring about the latching engagement between a bearing surface on the receiving part and a bearing surface at the end of said retaining surface on the plug-in part so as to secure the plug-in connection; and a tappet fixed to the plug-in part for triggering the at least one spring arm.

14. A plug-in connection according to claim 13, wherein the receiving part has bearing surfaces at respective ends of said retaining surfaces and wherein the securing element has two opposite spring arms which in the pre-assembly position are flexed in opposite directions and bear against opposite retaining surfaces on the receiving part, from which the two spring arms can be axially displaced in the joining direction and beyond said respective ends of said opposite retaining surfaces and released simultaneously when triggered in order to bring about the latching engagement between the bearing surfaces on the receiving part and the bearing surface on the plug-in part so as to secure the plug-in connection.

15. A plug-in connection according to claim 13, wherein the securing element fitted in a prestressed state on the receiving part is positioned so as to be triggered by the insertion movement of the plug-in part when the final assembled position is reached, said insertion movement taking place in the joining direction.

16. A plug-in connection according to claim 13, wherein the tappet is integrally formed in one piece on the plug-in part.

17. A plug-in connection according to claim 13, wherein the securing of the plug-in part to the receiving part is provided so as to be triggered when the sealing element between the receiving part and the plug-in part is elastically deformed in the final assembled position.

* * * * *

UNITED STATES PATENT AND TRADEMARK OFFICE
CERTIFICATE OF CORRECTION

| | | |
|---|---|---|
| PATENT NO. | : 8,613,473 B2 | |
| APPLICATION NO. | : 12/383488 | |
| DATED | : December 24, 2013 | |
| INVENTOR(S) | : Norbert Spielmann | |

It is certified that error appears in the above-identified patent and that said Letters Patent is hereby corrected as shown below:

IN THE SPECIFICATION

Column 3, line 24 – After "line", insert --III–III--

Signed and Sealed this
Fifteenth Day of April, 2014

Michelle K. Lee
*Deputy Director of the United States Patent and Trademark Office*